United States Patent
Hatano et al.

(10) Patent No.: US 6,763,719 B2
(45) Date of Patent: Jul. 20, 2004

(54) ACCELERATION SENSOR

(75) Inventors: Hiroyuki Hatano, Mohka (JP);
Masakatsu Saitoh, Yokohama (JP);
Shinji Furuichi, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/384,645

(22) Filed: Mar. 11, 2003

(65) Prior Publication Data

US 2003/0177832 A1 Sep. 25, 2003

(30) Foreign Application Priority Data

Mar. 25, 2002 (JP) .......................... 2002-083161
Apr. 5, 2002 (JP) .......................... 2002-103364

(51) Int. Cl.[7] .............................................. G01P 15/12
(52) U.S. Cl. ................................................... 73/514.33
(58) Field of Search ......................... 73/514.33, 514.34; 338/2, 5

(56) References Cited

U.S. PATENT DOCUMENTS 5,866,817 A  *  2/1999  Mori et al. ............... 73/514.33
6,293,149 B1 *  9/2001  Yoshida et al. ........... 73/514.01
6,662,659 B2 * 12/2003  Saitoh .................... 73/514.34

FOREIGN PATENT DOCUMENTS

JP          63-169078           7/1988

* cited by examiner

Primary Examiner—Helen Kwok
(74) Attorney, Agent, or Firm—Sughrue Mion, PLLC

(57) ABSTRACT

An ultra-small and slim semiconductor acceleration sensor with high sensitivity is provided. The acceleration sensor has a mass portion formed at a center part of a silicon semiconductor substrate, a frame formed on an edge part of the substrate, thin elastic support arms which are provided on top surfaces of the mass portion and the frame and connect the mass portion and the frame, and strain gauges constituted by a plurality of pairs of piezoresistors formed on top surfaces of the elastic support arms. A distance between a pair of Z-axis strain gauges provided on the top surface of the elastic support arm is made longer by 0.4L to 1.2L or shorter by 1.0L to 1.8L than a distance between a pair of X-axis strain gauges, whereby output of the Z-axis strain gauge is made at the same level as output of the X-axis strain gauge. Alternatively, an angle formed by the Z-axis strain gauge with an X-axis is made 10 to 30 degrees or 65 to 90 degrees, whereby the output of the Z-axis strain gauge is made at the same level as the output of the X-axis strain gauge.

22 Claims, 10 Drawing Sheets

DIFFERENCE IN RESISTOR LENGTH
BETWEEN Z-AXIS PIEZORESISTOR DISTANCE
AND X-AXIS PIEZORESISTOR DISTANCE

ACCELERATION SENSOR

BACKGROUND OF THE INVENTION

1. Field of the Invention

The present invention relates to an acceleration sensor for detecting acceleration, which is used for toys, automobiles, aircrafts, portable terminals and the like, and particularly to an acceleration sensor that can be produced using a semiconductor technology.

2. Description of the Related Art

Acceleration sensors utilizing a change in physical quantity such as a piezo resistance effect and a change in electrostatic capacity have been developed and commercialized. These acceleration sensors can be widely used in various fields, but recently, such small-sized acceleration sensors as can detect the acceleration in multi-axial directions at one time with high sensitivity are demanded.

Since silicon single crystal becomes an ideal elastic body due to the extreme paucity of lattice defect and since a semiconductor process technology can be applied for it without large modification, much attention is paid to a piezo resistance effect type semiconductor acceleration sensor in which a thin elastic support portion is provided at a silicon single crystal substrate, and the stress applied to the thin elastic support portion is converted into an electric signal by a strain gauge, for example, a piezo resistance effect element, to be an output.

As a conventional triaxial acceleration sensor, there is the one disclosed in, for example, Japanese Laid-Open Patent No. 63-169078, and its plan view is shown in FIG. 13, and a sectional view taken along the line XIV—XIV in FIG. 13 is shown in FIG. 14, and a perspective view is shown in FIG. 15. The acceleration sensor 500 has elastic support arms 530 each of a beam structure, constituted by a thin portion of a silicon single crystal substrate. A mass portion 520 in a center, which is constituted by a thick portion of a silicon single crystal substrate, and a frame 510 in a periphery thereof are connected by the elastic support arms 530. A plurality of strain gauges 560 are formed in each axial direction on the elastic support arms 530.

An entire structure will be explained, referring to FIG. 13, FIG. 14 and FIG. 15. The sensor 500 has the mass portion 520 constituted by the thick portion of the silicon single crystal substrate, a frame 510 placed to surround the mass portion 520, and two pairs of elastic support arms 530 in a beam form, which are perpendicular to each other and each constituted by the thin portion of the silicon single crystal substrate to bridge the mass portion 520 and the frame 510. When the acceleration works, the mass portion moves in the frame to deform the elastic support arms, and thus the deformation is detected by the strain gauges provided on the elastic support arms to obtain the acceleration that works. The acceleration in an X-axis direction in FIG. 13 is measured by the four strain gauges 560 provided on the elastic support arms extending in the X-axis direction, and the acceleration in a Y-axis direction is measured by the four strain gauges 560 provided on the elastic support arms extending in the Y-axis direction. The acceleration in a Z-axis direction is measured by means of all the strain gauges 560. By making four L-shaped through-holes 550 in the silicon single crystal substrate having the size of the frame 510, the mass portion 520 in the center, the frame 510 in the periphery and the support arms 530 bridging them are formed, and by making the support arm portions thin, the acceleration sensor is constructed to be deformable and highly sensitive.

Although the acceleration in the Z-axis direction is detected or measured by both the strain gauges 560 that detect X-axis acceleration and the strain gauges 560 that detect Y-axis acceleration in the acceleration sensor 500 shown in FIGS. 13 through 15, it is preferable that a circuit detecting Z-axis acceleration is separated from a circuit detecting X-axis/Y-axis acceleration. In the co-pending patent application, Chinese Patent Application N/A (Feb. 12, 2003), European Patent Application 03002164.6 (Feb. 3, 2003), Korean Patent Application 10-2003-008738 (Feb. 12, 2003) and U.S. Ser. No. 10/357,408 (Feb. 4, 2003) filed by the same assignee based on Japanese Patent Application 2002-33696 of Feb. 12, 2002, strain gauges for detecting Z-axis acceleration are different from strain gauges for detecting X-axis acceleration, while the Z-axis strain gauges are located on elastic support arms in X-axis direction in the same way as X-axis strain gauges.

In FIG. 16, an acceleration sensor 600 has a mass portion 620 in a center, a thick frame 610 around it, and elastic support arms 631, 632, 633 and 634 for bridging the mass portion 620 and the thick frame 610. Since the elastic support arms 631, 632, 633 and 634 are thin, the mass portion deforms the elastic support arms when acceleration acts on the mass portion 620. Large deformation of each of the elastic support arms occurs to end portions of the elastic support arms, that is, connecting portions of an edge of a top surface of the mass portion and the elastic support arms, and connecting portions of inside edges of a top surface of the thick frame and the elastic support arms. In order to enhance the sensitivity of the acceleration sensor, strain gauges are attached at the portions of the elastic support arms, which are deformed most by the acceleration.

In the acceleration sensor 600 in FIG. 16, strain gauges 661, 662, 663 and 664 for detecting acceleration in the X-axis direction, and strain gauges 681, 682, 683 and 684 for detecting acceleration in the Z-axis direction are placed on the elastic support arms 631 and 633. It is generally known that there exists the relationship as shown in FIG. 17 between sensitivities of the X-axis strain gauge and the Z-axis strain gauge (output with respect to acceleration 1 G, and drive voltage 1 V). When the acceleration of 1 G in the X-axis direction acts on the mass portion, bending moment applied to the elastic support arm is proportional to a product of a distance from the top surface of the mass portion to a center of gravity of the mass portion by a mass of the mass portion. Since the bending moment is proportional to the distance and the mass, the sensitivity in the X-axis direction changes as a quadric function with respect to the thickness of the mass portion. On the other hand, when the acceleration of 1 G acts in the Z-axis direction, the bending moment applied to the elastic support arm is proportional to a product of length of the elastic support arm and mass of the mass portion. When the thickness of the mass portion is changed, the length of the elastic support arm does not change, but only the mass of the mass portion changes, and therefore the sensitivity of the Z-axis becomes a linear function.

When the acceleration sensor 600 shown in FIG. 16 is produced with use of a Si single crystal substrate which is generally used in semiconductor fabrication, thickness of the Si single crystal substrate is 625 $\mu$m or 525 $\mu$m, and therefore as can be seen from FIG. 17, the sensitivity of the Z-axis strain gauge becomes larger than that of the X-axis strain gauge. If the sensitivities of the Z-axis strain gauge and the X-axis strain gauge are about the same, the amplifiers having about the same output amplification factors can be used for the Z-axis strain gauge and the X-axis strain gauge. In order to make the sensitivity of the Z-axis strain gauge the same as that of the X-axis strain gauge, it is suitable to make the acceleration sensor 600 with use of the Si single crystal substrate of thickness of about 800 μm, but such a thick Si single crystal substrate as this has to be especially prepared only for this acceleration sensor, and this increases the cost of the acceleration sensor.

Alternatively, it is theoretically possible to change piezo-properties by changing impurity concentrations of the piezoresistors used for the Z-axis strain gauge and X(Y)-axis strain gauge. However, when the piezoresistors are formed, only doping of the impurities to the Z-axis resistor has to be performed in a separate process step, and therefore the cost is raised. Further, there arises the fear that the thermal properties of the Z-axis piezoresistor and the X(Y)-axis piezoresistor differ.

Alternatively, it is possible to change the shape of the Z-axis resistor from that of the X(Y)-axis resistor to reduce the output power of the Z-axis resistor and thereby make it about the same as the output of the X(Y)-axis resistor, but the resistance value is changed to make it difficult to keep the bridge balance, and therefore it is desirable that all the resistors have the same shapes.

SUMMARY OF THE INVENTION

Therefore, it is an object of the present invention to provide a compact and thin acceleration sensor having very little sensitivity differences among three-axis resistors of X-axis, Y-axis and Z-axis with low manufacturing cost, while maintaining resistivities and thermal dependency in the same level among them.

An acceleration sensor according to the present invention comprises:

a mass portion provided in a center of the acceleration sensor and having a top surface;
a thick frame surrounding the mass portion with a predetermined distance from the mass portion and having a top surface;
a plurality of elastic support arms each extending (e.g., in X-axis direction) from an edge of the top surface of the mass portion, bridging the top surface edge of the mass portion and an inside edge of the top surface of the thick frame and hanging the mass portion inside of the thick frame;
two first strain gauges disposed on a top surface of each of the elastic support arms with a distance from each other along the elastic support arm extending (e.g., in X-axis direction), and extending in the direction of the elastic support arm extending (e.g., in X-axis direction); and
two second strain gauges disposed on the top surface of the elastic support arm having the two first strain gauges and with a distance different from the first strain gauge distance between the two second strain gauges along the elastic support arm (e.g., in X-axis direction), and extending in the direction of the elastic support arm extending (e.g., in X-axis direction),
the two first strain gauges detecting an acceleration in the direction of the elastic support arm extending (e.g., in X-axis direction) and the two second strain gauges detecting an acceleration in the direction (Z-axis direction) perpendicular to the top surface of the mass portion.

In the acceleration sensor as described above, one of the two first strain gauges may be disposed entirely on the top surface of the elastic support arm so that an end of the one of the first strain gauges is substantially located at the inside edge of the top surface of the thick frame, and the other of the two first strain gauges may be disposed entirely on the top surface of the elastic support arm so that an end of the other of the first strain gauges is substantially located at the top surface edge of the mass portion. One of the two second strain gauges is desirably disposed, bridging the top surface of the thick frame and the top surface of the elastic support arm so that one end of the one of the second strain gauges is located on the top surface of the elastic support arm and the other end of the one of the second strain gauges is located on the top surface of the thick frame. And, the other of the two second strain gauges is desirably disposed, bridging the top surface of the mass portion and the top surface of the elastic support arm so that one end of the other of the second strain gauges is located on the top surface of the mass portion and the other end of the other of the second strain gauges is located on the top surface of the elastic support arm.

In the acceleration sensor, the distance between the two second strain gauges is preferably longer by 0.4 to 1.2 times a length of the strain gauges than the distance between the two first strain gauges. And, it is more preferably that the distance between the two second strain gauges is longer by 0.6 to 1.0 times a length of the strain gauges than the distance between the two first strain gauges.

In the acceleration sensor, the two second strain gauges may be disposed entirely on the top surface of the elastic support arm so that all ends of the two second strain gauges are apart from ends of the elastic support arm. In the case, the distance between the two second strain gauges is desirably shorter by 1.0 to 1.8 times a length of the strain gauges than the distance between the two first strain gauges. It is more desirable that the distance between the two second strain gauges is shorter by 1.2 to 1.6 times a length of the strain gauges than the distance between the two first strain gauges.

An acceleration sensor according to the invention comprises:

a mass portion provided in a center of the acceleration sensor and having a top surface;
a thick frame surrounding the mass portion with a predetermined distance from the mass portion and having a top surface;
two first elastic support arms extending in parallel and in opposite directions to each other (e.g., in +X-axis and −X-axis directions) from opposite edges of the top surface of the mass portion, bridging the top surface edges of the mass portion and inside edges of the top surface of the thick frame and hanging the mass portion inside of the thick frame;
two first strain gauges disposed on a top surface of each of the first elastic support arms with a distance from each other along the first elastic support arm extending (e.g., in +X-axis/−X-axis direction), and extending in the direction of the first elastic support arm extending (e.g., in +X-axis/−X-axis direction),
    one of the two first strain gauges disposed entirely on the top surface of the first elastic support arm so that an end of the one of the two first strain gauges is located substantially at the inside edge of the top surface of the thick frame, and the other of the two first strain gauges disposed entirely on the top surface of the first elastic support arm so that an end of the other of the two first strain gauges is located substantially at the top surface edge of the mass portion;
two second strain gauges disposed on the top surface of each of the first elastic support arms with a distance longer by 0.4 to 1.2 times a length of the strain gauges than the distance between the two first strain gauges along the first elastic support arms extending (e.g., in +X-axis/−X-axis direction), and extending in the direction of the first elastic support arm (e.g., in +X-axis/−X-axis direction),
one of the two second strain gauges disposed, bridging the top surface of the thick frame and the top surface of the first elastic support arm so that one end of the one of the two second strain gauges is located on the top surface of thick frame and the other end of the one of the two second strain gauges is located on the top surface of the first elastic support arm, and
the other of the two second strain gauges disposed, bridging the top surface of the mass portion and the top surface of the first elastic support arm so that one end of the other of the two second strain gauges is located on the top surface of the mass portion and the other end of the other of the two second strain gauges is located on the top surface of the first elastic support arm;
two second elastic support arms extending in parallel and in opposite directions to each other (e.g., in +Y-axis and −Y-axis directions) from other opposite edges of the top surface of the mass portion, bridging the other top surface edges of the mass portion and other inside edges of the top surface of the thick frame and hanging the mass portion inside of the thick frame; and
two third strain gauges disposed on a top surface of each of the second elastic support arms with a distance from each other along the second elastic support arm extending (e.g., in +Y-axis/−Y-axis direction), and extending in the direction of the second elastic support arm extending (e.g., in +Y-axis/−Y-axis direction),
one of the two third strain gauges disposed entirely on the top surface of the second elastic support arm so that an end of the one of the two third strain gauges is located substantially at the other inside edge of the top surface of the thick frame, and
the other of the two third strain gauges disposed entirely on the top surface of the second elastic support arm so that an end of the other of the two third strain gauges is located substantially at the top surface edge of the mass portion,
the two first strain gauges detecting an acceleration in the direction of the first elastic support arm extending (e.g., in X-axis direction), the two second strain gauges detecting an acceleration in the direction (Z-axis direction) perpendicular to the top surface of the mass portion and the two third strain gauges detecting an acceleration in the direction of the second elastic support arm extending (e.g., in Y-axis direction).

An acceleration sensor of the invention comprises:

a mass portion provided in a center of the acceleration sensor and having a top surface;
a thick frame surrounding the mass portion with a predetermined distance from the mass portion and having a top surface;
two first elastic support arms extending in parallel and in opposite directions to each other (e.g., in +X-axis and −X-axis directions) from opposite edges of the top surface of the mass portion, bridging the top surface edges of the mass portion and inside edges of the top surface of the thick frame and hanging the mass portion inside of the thick frame;
two first strain gauges disposed on a top surface of each of the first elastic support arms with a distance from each other along the first elastic support arm extending (e.g., in +X-axis/−X-axis direction), and extending in the direction of the first elastic support arm extending (e.g., in +X-axis/−X-axis direction),
one of the two first strain gauges disposed entirely on the top surface of the first elastic support arm so that an end of the one of the two first strain gauges is located substantially at the inside edge of the top surface of the thick frame, and the other of the two first strain gauges disposed entirely on the top surface of the first elastic support arm so that an end of the other of the two first strain gauges is located substantially at the top surface edge of the mass portion;
two second strain gauges disposed on the top surface of each of the first elastic support arms with a distance shorter by 1.0 to 1.8 times a length of the strain gauges than the distance between the two first strain gauges along the first elastic support arms extending (e.g., in +X-axis/−X-axis direction), and extending in the direction of the first elastic support arm (e.g., in +X-axis/−X-axis direction),
the two second strain gauges disposed entirely on the top surface of the first elastic support arm so that all ends of the two second strain gauges are apart from all ends of the top surface of the first elastic support arm;
two second elastic support arms extending in parallel and in opposite directions to each other (e.g., in +Y-axis and −Y-axis directions) from other opposite edges of the top surface of the mass portion, bridging the other top surface edges of the mass portion and other inside edges of the top surface of the thick frame and hanging the mass portion inside of the thick frame; and
two third strain gauges disposed on a top surface of each of the second elastic support arms with a distance from each other along the second elastic support arm extending (e.g., in +Y-axis/−Y-axis direction), and extending in the direction of the second elastic support arm extending (e.g., in +Y-axis/−Y-axis direction),
one of the two third strain gauges disposed entirely on the top surface of the second elastic support arm so that an end of the one of the two third strain gauges is located substantially at the other inside edge of the top surface of the thick frame, and
the other of the two third strain gauges disposed entirely on the top surface of the second elastic support arm so that an end of the other of the two third strain gauges is located substantially at the top surface edge of the mass portion,
the two first strain gauges detecting an acceleration in the direction of the first elastic support arm extending (e.g., in X-axis direction), the two second strain gauges detecting an acceleration in the direction (Z-axis direction) perpendicular to the top surface of the mass portion and the two third strain gauges detecting an acceleration in the direction of the second elastic support arm extending (e.g., in Y-axis direction).

An acceleration sensor of the invention comprises:

a mass portion provided in a center of the acceleration sensor and having a top surface;
a thick frame surrounding the mass portion with a predetermined distance from the mass portion and having a top surface;
a plurality of elastic support arms each extending (e.g., in X-axis direction) from an edge of the top surface of the mass portion, bridging the top surface edge of the mass portion and an inside edge of the top surface of the thick frame and, hanging the mass portion inside of the thick frame;

two first strain gauges disposed on a top surface of each of the elastic support arms with a distance from each other along the elastic support arm extending (e.g., in X-axis direction), and extending in the direction of the elastic support arm extending (e.g., in X-axis direction); and two second strain gauges disposed on the top surface of the elastic support arm having the two first strain gauges and at an angle with the direction of the elastic support arm extending (e.g., X-axis), the two first strain gauges detecting an acceleration in the direction of the elastic support arm extending (e.g., in X-axis direction) and the two second strain gauges detecting an acceleration in the direction (Z-axis direction) perpendicular to the top surface of the mass portion.

In the acceleration sensor as described above, one of the two first strain gauges and one of the two second strain gauges may be disposed entirely on the top surface of the elastic support arm so that an end of each of the one of the two first strain gauges and the one of the two second strain gauges is substantially located at the inside edge of the top surface of the thick frame, and the other of the two first strain gauges and the other of the two second strain gauges may be disposed entirely on the top surface of the elastic support arm so that an end of each of the other of the two first strain gauges and the other of the two second strain gauges is substantially located at the top surface edge of the mass portion. It is preferable that each of the two second strain gauges is disposed at an angle of 10 to 30 degrees or 65 to 90 degrees with the direction of the elastic support arm extending (e.g., X-axis).

An acceleration sensor of the invention comprises:

a mass portion provided in a center of the acceleration sensor and having a top surface;
a thick frame surrounding the mass portion with a predetermined distance from the mass portion and having a top surface;
two first elastic support arms extending in parallel and in opposite directions to each other (e.g., in +X-axis and −X-axis directions) from opposite edges of the top surface of the mass portion, bridging the top surface edges of the mass portion and inside edges of the top surface of the thick frame and hanging the mass portion inside of the thick frame;
two first strain gauges disposed on a top surface of each of the first elastic support arms with a distance from each other along the first elastic support arm extending (e.g., in X-axis direction), and extending in the direction of the first elastic support arm extending (e.g., in X-axis direction),
two second strain gauges disposed on the top surface of each of the first elastic support arms at an angle of 10 to 30 degrees or 65 to 90 degrees with the direction (e.g., X-axis) of the first elastic support arm extending,
  one of the two first strain gauges and one of the two second strain gauges disposed entirely on the top surface of the first elastic support arm so that an end of each of the one of the two first strain gauges and the one of the two second strain gauges is located substantially at the inside edge of the top surface of the thick frame, and
  the other of the two first strain gauges and the other of the two second strain gauges disposed entirely on the top surface of the first elastic support arm so that an end of each of the other of the two first strain gauges and the other of the two second strain gauges is located substantially at the top surface edge of the mass portion;

two second elastic support arms extending in parallel and in opposite directions to each other (e.g., in +Y-axis and −Y-axis directions) from other opposite edges of the top surface of the mass portion, bridging the other top surface edges of the mass portion and other inside edges of the top surface of the thick frame and hanging the mass portion inside of the thick frame; and
two third strain gauges disposed on a top surface of each of the second elastic support arms with a distance from each other along the second elastic support arm extending (e.g., in Y-axis direction), and extending in the direction of the second elastic support arm extending (e.g., in Y-axis direction),
  one of the two third strain gauges disposed entirely on the top surface of the second elastic support arm so that an end of the one of the two third strain gauges is located substantially at the other inside edge of the top surface of the thick frame, and
  the other of the two third strain gauges disposed entirely on the top surface of the second elastic support arm so that an end of the other of the two third strain gauges is located substantially at the top surface edge of the mass portion,
the two first strain gauges detecting an acceleration in the direction of the first elastic support arm extending (e.g., in X-axis direction), the two second strain gauges detecting an acceleration in the direction (Z-axis direction) perpendicular to the top surface of the mass portion and the two third strain gauges detecting an acceleration in the direction of the second elastic support arm extending (e.g., in Y-axis direction).

Further, an acceleration sensor of the invention comprises:

a mass portion provided in a center of the acceleration sensor and having a top surface;
a thick frame surrounding the mass portion with a predetermined distance from the mass portion and having a top surface;
a plurality of elastic support arms each extending (e.g., in X-axis direction) from an edge of the top surface of the mass portion, bridging the top surface edge of the mass portion and an inside edge of the top surface of the thick frame and hanging the mass portion inside of the thick frame; two first strain gauges disposed on a top surface of each of the elastic support arms with a distance from each other along the elastic support arm extending (e.g., in X-axis direction), and extending in the direction of the elastic support arm extending (e.g., in X-axis direction); and
two second strain gauges disposed on the top surface of the elastic support arm having the two first strain gauges and with a distance different from the first strain gauge distance between the two second strain gauges along the elastic support arm (e.g., in X-axis direction), and extending at an angle with the direction of the elastic support arm extending (e.g., X-axis),
the two first strain gauges detecting an acceleration in the direction of the elastic support arm extending (e.g., in X-axis direction) and the two second strain gauges detecting an acceleration in the direction (Z-axis direction) perpendicular to the top surface of the mass portion.

In the acceleration sensor above, it is preferable that one of the two first strain gauges and one of the two second strain gauges are disposed entirely on the top surface of the elastic support arm so that an end of each of the one of the two first strain gauges and the one of the two second strain gauges is substantially located at the inside edge of the top surface of the thick frame, and that the other of the two first strain gauges and the other of the two second strain gauges are disposed entirely on the top surface of the elastic support arm so that an end of each of the other of the two first strain gauges and the other of the two second strain gauges is substantially located at the top surface edge of the mass portion. It is preferable that each of the two second strain gauges is disposed at an angle of 10 to 30 degrees or 65 to 90 degrees with the direction of the elastic support arm extending (e.g., X-axis). The distance between the two second strain gauges is preferably longer by 0.4 to 1.2 times a length of the strain gauges than the distance between the two first strain gauges. The distance between the two second strain gauges is more preferably longer by 0.6 to 1.0 times a length of the strain gauges than the distance between the two first strain gauges. Alternatively, the distance between the two second strain gauges is preferably shorter by 1.0 to 1.8 times a length of the strain gauges than the distance between the two first strain gauges. It is more preferable that the distance between the two second strain gauges is shorter by 1.2 to 1.6 times a length of the strain gauges than the distance between the two first strain gauges.

DETAILED DESCRIPTION OF THE PREFERRED EMBODIMENTS

EXAMPLE 1

Figure 1:
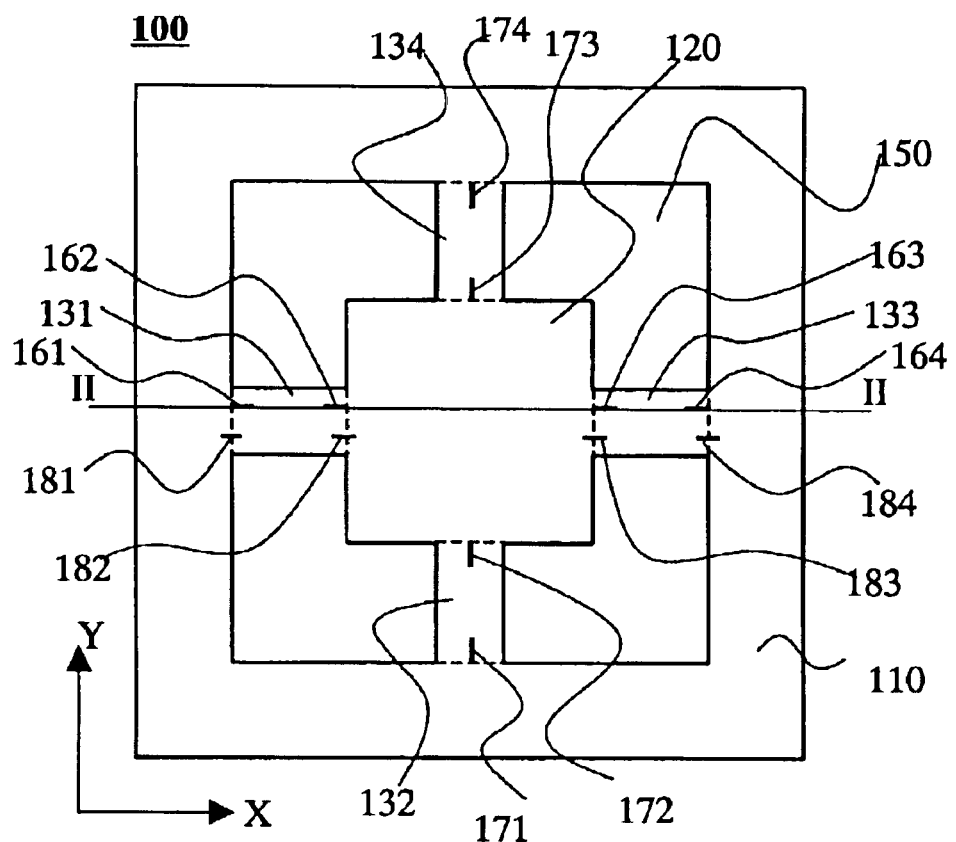
FIG. 1 is a plan view showing an acceleration sensor of EXAMPLE 1 of the present invention.
Figure 2:
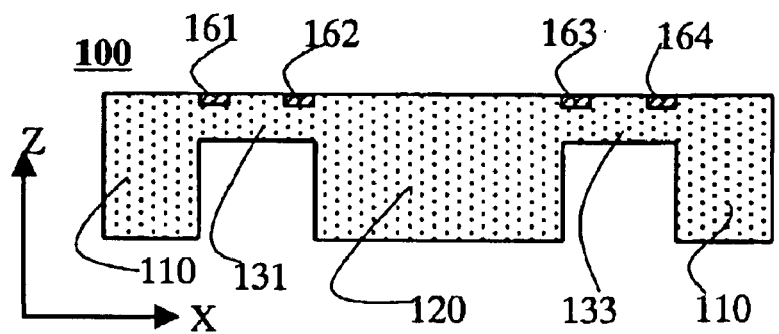
FIG. 2 is a sectional view of the acceleration sensor in FIG. 1 taken along the line II—II in FIG. 1.

An acceleration sensor of an EXAMPLE 1 of the present invention will be explained with reference to FIGS. 1 through 4. FIG. 1 is a plan view of the acceleration sensor. FIG. 2 is a sectional view taken along the line II—II in FIG. 1, FIG. 3 is an enlarged plan view showing an elastic support arm of the acceleration sensor and FIG. 4 is a graph showing a relationship between the ratio of Z-axis piezoresistor output to X-axis piezoresistor output and difference between Z-axis piezoresistor distance and X-axis piezoresistor distance in the acceleration sensor of EXAMPLE 1 of the present invention.

The acceleration sensor of the present invention uses a silicon single crystal substrate with a SOI layer being formed via a $SiO_2$ insulation layer, namely, a SOI wafer, in order to make it possible to control the thickness of elastic support arms with high precision. The SOI is an abbreviation of a Silicon On Insulator. In this example, a wafer formed by thinly forming the $SiO_2$ insulation layer being an etching stopper (about 1 $\mu$m) on an Si wafer with thickness of about 625 $\mu$m, on which an N-type silicon single crystal layer with thickness of about 10 $\mu$m is formed, is used as a substrate. In an accelerator sensor 100 of the EXAMPLE, four L-shaped through-holes 150 in a square-shaped silicon single crystal substrate of the same size as a frame 110 are made, whereby a mass portion 120 in a center, a thick frame 110 around it, and support arms placed between them are formed, and by making the portions of the support arms thin to make elastic support arms 131, 132, 133 and 134. The acceleration sensor 100 has strain gauges (in the explanation below, a "piezoresistor" as an example of a strain gauge is used, and therefore they are called "piezoresistors") 161 to 164, 171 to 174 and 181 to 184, which are placed on the elastic support arms to be corresponding to two perpendicular detection axes (axes X and Y) and a detection axis (axis Z) perpendicular to a top surface of the acceleration sensor, with four stain gauges for each axis. Namely, on the elastic support arms 131 and 133 extending in the X-axis direction, pairs of piezoresistors 161 and 162, and 163 and 164 are provided respectively to detect acceleration in the X-axis direction. Pairs of the piezoresistors 171 and 172, and 173 and 174 are provided respectively on the elastic support arms 132 and 134 extending in the Y-axis direction to detect acceleration in the Y-axis direction. Further, pairs of piezoresistors 181 and 182, and 183 and 184 are provided respectively on the elastic support arms 131 and 133 extending in the X-axis direction to detect acceleration in the Z-axis direction. In this example, the acceleration in the Z-axis direction is detected with the piezoresistors provided on the elastic support arms 131 and 133, but the element detecting the acceleration in the Z-axis direction may be provided on the elastic support arms 132 and 134. The four piezoresistors for detecting the acceleration in each axis direction construct separate full bridge detection circuits.

Figure 3:
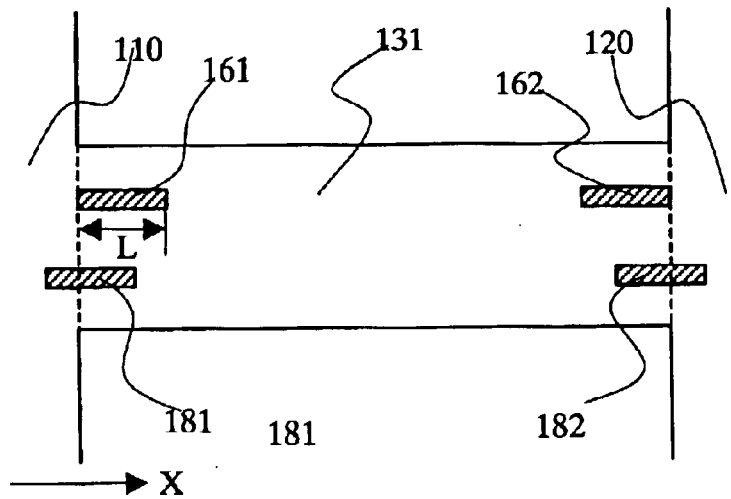
FIG. 3 is an enlarged plan view showing an elastic support arm of the acceleration sensor of EXAMPLE 1 of the present invention.
Figure 4:
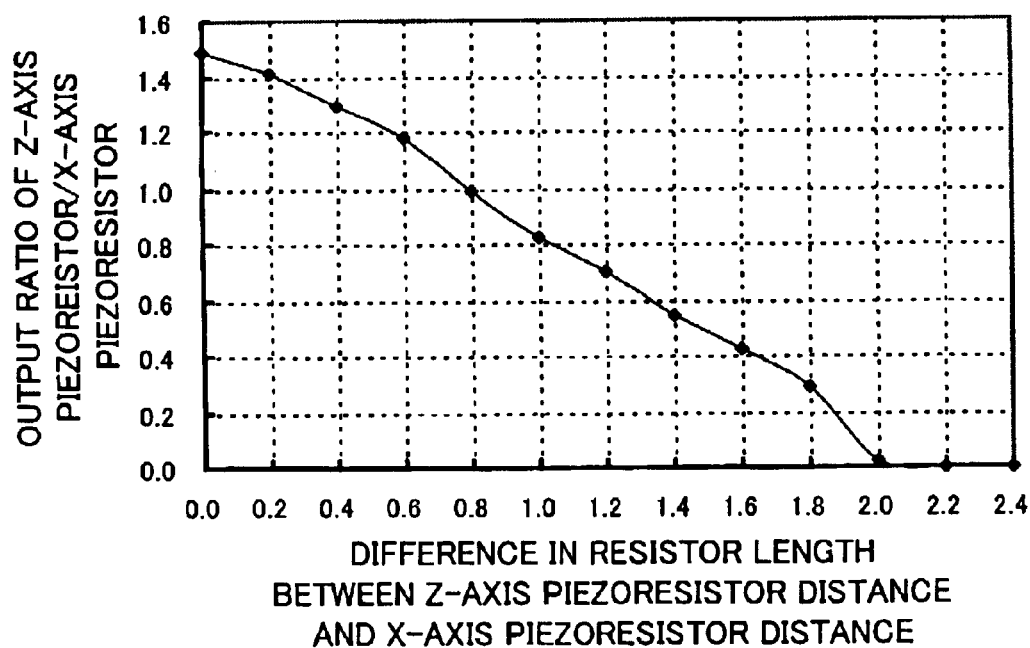
FIG. 4 is a graph showing a relationship between ratio of Z-axis piezoresistor output to X-axis piezoresistor output and difference between Z-axis piezoresistor distance and X-axis piezoresistor distance in the acceleration sensor of EXAMPLE 1 of the present invention.

Explaining the acceleration sensor 100 according to the EXAMPLE 1 of the present invention mainly with reference to FIG. 1 and FIG. 3, the two piezoresistors 161 and 162 for detecting the acceleration in the X-axis direction, which are provided on the elastic support arm 131, are aligned in the X-axis direction and extend in the X-axis direction. The two piezoresistors are at each end of the elastic support arm 131, and respective ends of the two piezoresistors are located on a border between an inside edge of a top surface of the thick frame 110 and the elastic support arm 131 and on a border between the elastic support arm 131 and a top surface edge of the mass portion 120. The two piezoresistors 163 and 164 for detecting the acceleration in the X-axis direction, which are provided on the elastic support arm 133, are aligned in the X-axis direction and extend in the X-axis direction. The two piezoresistors are at each end of the elastic support arm 133, and respective ends of the two piezoresistors are located on a border between a top surface edge of the mass portion 120 and the elastic support arm 133 and on a border between the elastic support arm 133 and an inside edge of the top surface of the thick frame 110. The two piezoresistors 161 and 162 on the elastic support arm 131 are separated from each other by a distance which is the result of subtracting the piezoresistor length L from the length of the elastic support arm 131. Similarly, the two piezoresistors 163 and 164 on the elastic support arm 133 are separated from each other by a distance which is the result of subtracting the piezoresistor length L from the length of the elastic support arm 133.

The piezoresistors 171 to 174 for detecting the acceleration in the Y-axis direction are aligned in the Y-axis direction and extend in the Y-axis direction. Out of them, the piezoresistors 171 and 172 are at each end of the elastic support arm 132, and are provided on the elastic support arm 132 so that respective ends of the piezoresistors 171 and 172 are on a border between an inside edge of the top surface of the thick frame 110 and the elastic support arm 132 and on a border between the elastic support arm 132 and a top surface edge of the mass portion 120. The piezoresistors 173 and 174 are at each end of the elastic support arm 134, and are provided on the elastic support arm 134 so that respective ends of the piezoresistors 173 and 174 are on a border between a top surface edge of the mass portion 120 and the elastic support arm 134 and on a border between the elastic support arm 134 and an inside edge of the top surface of the thick frame 110. The two piezoresistors 171 and 172 on the elastic support arm 132 are separated from each other by a distance which is the result of subtracting the piezoresistor length L from the length of the elastic support arm 132. Similarly, the two piezoresistors 173 and 174 on the elastic support arm 134 are separated from each other by a distance which is the result of subtracting the piezoresistor length L from the elastic support arm 134.

The piezoresistors 181 and 182 for detecting the acceleration in the Z-axis direction, which are on the elastic support arm 131, are aligned in the X-axis direction and extend in the X-axis direction. The piezoresistor 181 is provided to extend from the top surface of the thick frame onto the elastic support arm 131, and the piezoresistor 182 is provided to extend from a portion on the elastic support arm 131 onto the top surface of the mass portion. The piezoresistors 183 and 184 for detecting the acceleration in the Z-axis direction, which are on the elastic support arm 133, are aligned in the X-axis direction and extend in the X-axis direction. The piezoresistor 183 is provided to extend from the top surface of the mass portion onto the elastic support arm 133, and the piezoresistor 184 is provided to extend from a portion on the elastic support arm 133 onto the top surface of the thick frame.

The two piezoresistors 181 and 182 on the elastic support arm 131 are separated from each other by a longer distance than the distance which is the result of subtracting the piezoresistor length L from the length of the elastic support arm 131. Similarly, the two piezoresistors 183 and 184 on the elastic support arm 133 are separated from each other by a longer distance than the distance which is the result of subtracting the piezoresistor length L from the length of the elastic support arm 133.

In the acceleration sensor of the present invention, since the elastic support arm 131 and the elastic support arm 133 are usually formed to have the same length, the distance between the two piezoresistors for detecting the acceleration in the Z-axis direction is longer than the distance between the two piezoresistors for detecting the acceleration in the X-axis (or Y-axis) direction. It is preferable that the difference between these distances is 0.4 to 1.2 times as long as the piezoresistor length L. More preferably, the difference between these distances is 0.6 to 1.0 times as long as the piezoresistor length L.

The graph in FIG. 4 shows the result of measuring the ratio of the Z-axis piezoresistor output to the X-axis piezoresistor output by changing the difference between the Z-axis piezoresistor distance and the X-axis piezoresistor distance from 0 to 2.4L. As is seen from this graph, the Z-axis piezoresistor output/the X-axis piezoresistor output becomes 1.0 when the difference in the distances is about 0.8L. When the difference in the distances is 0.6L to 1.0L, the output ratio becomes 1.2 to 0.8. From this graph, it can be seen in the acceleration sensor of the present invention, the Z-axis output and the X-axis (or Y-axis) output are at substantially the same level.

EXAMPLE 2

Figure 5:
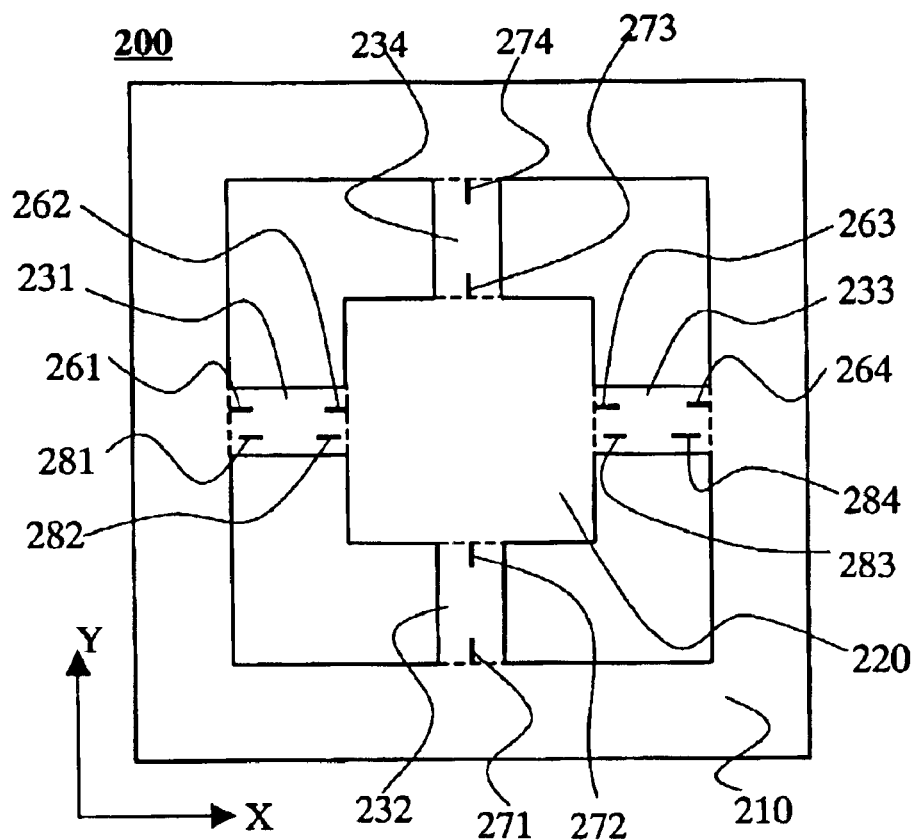
FIG. 5 is a plan view showing an acceleration sensor of EXAMPLE 2 of the present invention.
Figure 6:
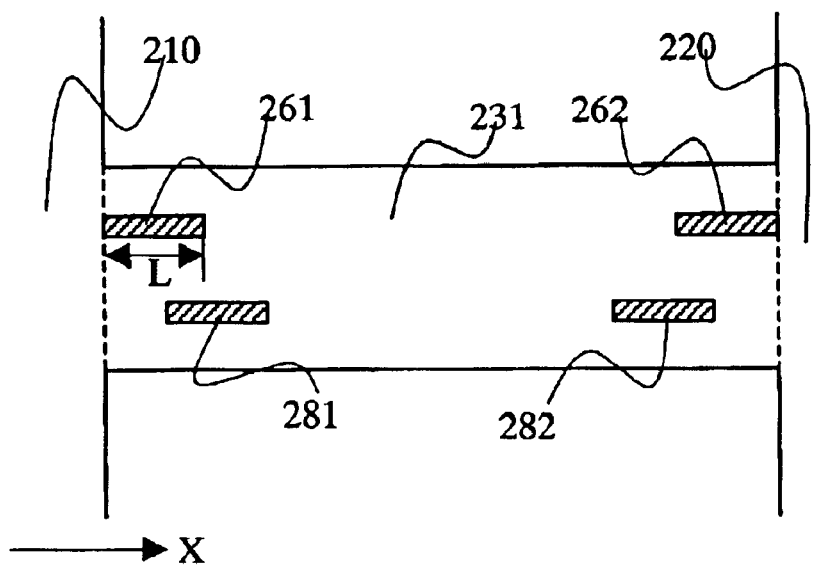
FIG. 6 is an enlarged plan view showing an elastic support arm of the acceleration sensor of EXAMPLE 2 of the present invention.
Figure 7:
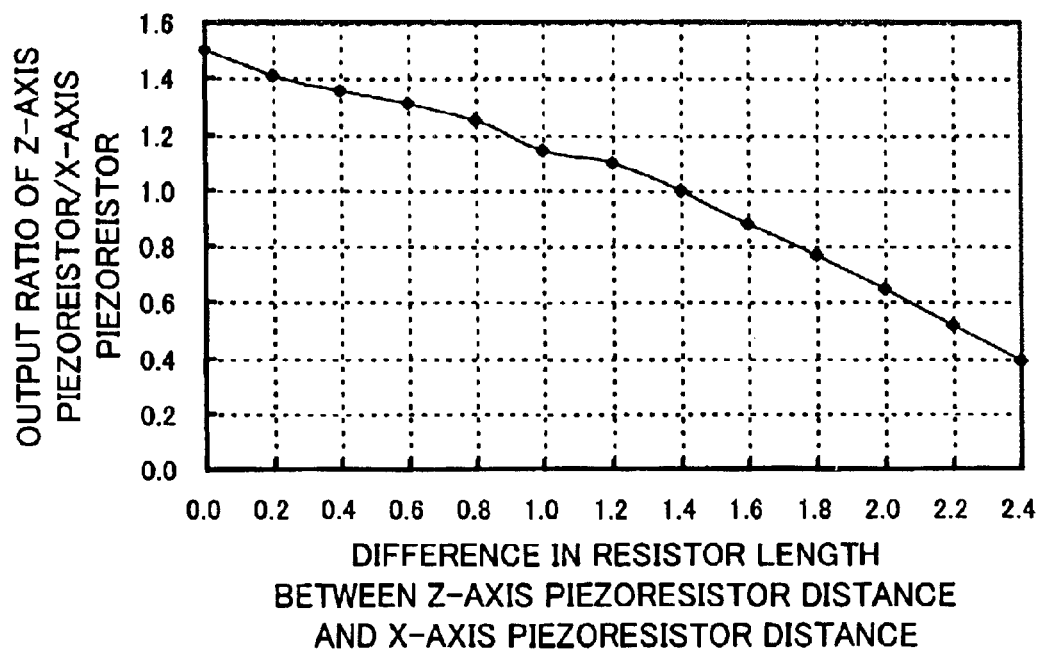
FIG. 7 is a graph showing ratio of Z-axis piezoresistor output to X-axis piezoresistor output vs. difference between Z-axis piezoresistor distance and X-axis piezoresistor distance in the acceleration sensor of EXAMPLE 2 of the present invention.

The acceleration sensor of an EXAMPLE 2 of the present invention will be explained with reference to FIGS. 5 through 7. FIG. 5 is a plan view of an acceleration sensor 200, FIG. 6 is an enlarged plan view showing one of elastic support arms in FIG. 5, and FIG. 7 is a graph showing the ratio of the Z-axis piezoresistor output to the X-axis piezoresistor output in relation with the difference between the Z-axis piezoresistor distance and the X-axis piezoresistor distance in the acceleration sensor of the EXAMPLE 2 of the present invention. The acceleration sensor 200 is substantially the same as the acceleration sensor 100 of the EXAMPLE 1, but all ends of piezoresistors 281 and 282 for detecting the acceleration in the Z-axis direction are away from a border between a top surface edge of a thick frame 210 and an elastic support arm 231 and from a border between the elastic support arm 231 and a top surface edge of a mass portion 220, and are provided on the elastic support arm 231. As for two piezoresistors 283 and 284 in the Z-axis direction provided on an elastic support arm 233, all ends thereof are provided to be away from a border between the top surface edge of the mass portion 220 and the elastic support arm 233 and from a border between the elastic support arm 233 and an inside edge of the top surface of the thick frame 210.

X-axis piezoresistors 261 and 262, and 263 and 264 are provided respectively on the elastic support arms 231 and 233 extending in the X-axis direction, and are placed in the same manner as those of the acceleration sensor 100. Y-axis piezoresistors 271 and 272, and 273 and 274 are provided respectively on elastic support arms 232 and 234 extending in the Y-axis direction, and are placed in the same manner as those of the acceleration sensor 100.

The two Z-axis piezoresistors 281 and 282 are separated from each other by a shorter distance than the distance which is the result of subtracting the piezoresistor length L from the length of the elastic support arm 231. Similarly, the two Z-axis piezoresistors 283 and 284 are separated from each other by a shorter distance than the length which is the result of subtracting the piezoresistor length L from the length of the elastic support arm 233. Since the elastic support arm 231 and the elastic support arm 233 are usually made to have the same length, the distance between the two piezoresistors for detecting the acceleration in the Z-axis direction is shorter than the distance between the two piezoresistors for detecting the acceleration in the X-axis (or Y-axis) direction in the acceleration sensor of the EXAMPLE 2. It is preferable that the difference between these distances is 1.0L to 1.8L. More preferably, the difference between these distances is 1.2L to 1.6L.

The graph in FIG. 7 shows a result of measuring a ratio of the Z-axis piezoresistor output to the X-axis piezoresistor output by changing the difference between the Z-axis piezoresistor distance and the X-axis piezoresistor distance from 0 to 2.4L. As is seen from the graph, the Z-axis piezoresistor output/the X-axis piezoresistor output becomes 1.0 when the difference in the distances is about 1.4L. When the difference in the distances is 1.0L to 1.8L, the output ratio becomes 1.15 to 0.8. When the difference in the distances is 1.2L to 1.6L, the ratio becomes 1.1 to 0.9. From this graph, it can be seen that in the acceleration sensor of the present invention, the Z-axis output and the X-axis (or Y-axis) output are at substantially the same level.

EXAMPLE 3

Figure 8:
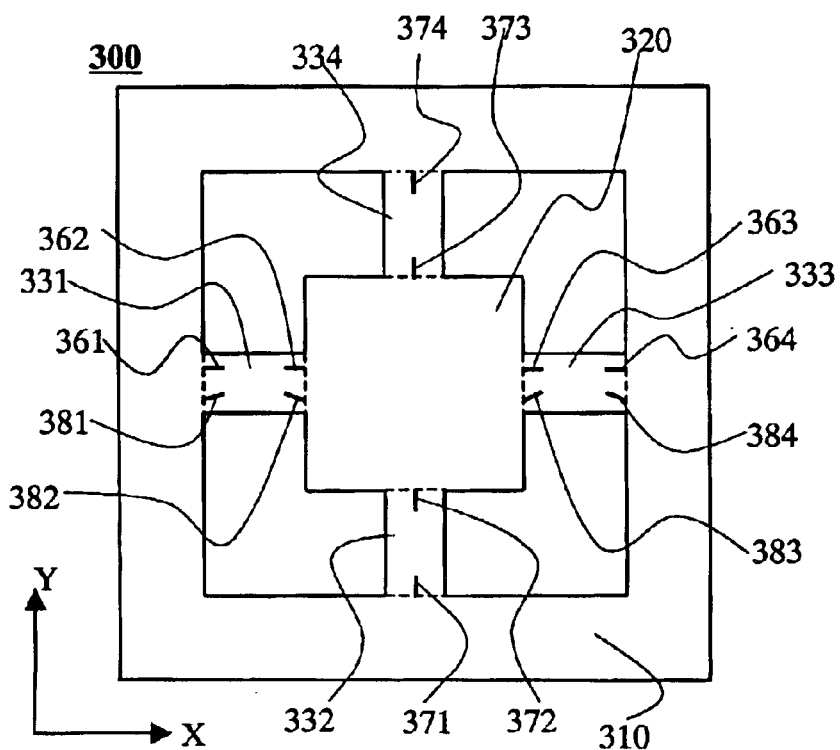
FIG. 8 is a plan view showing an acceleration sensor of EXAMPLE 3 of the present invention.
Figure 9:
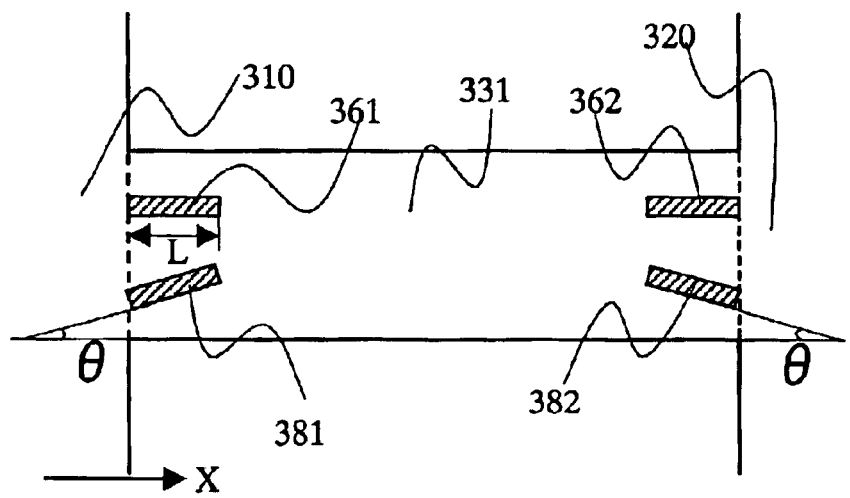
FIG. 9 is an enlarged plan view showing an elastic support arm of the acceleration sensor of EXAMPLE 3 of the present invention.
Figure 10:
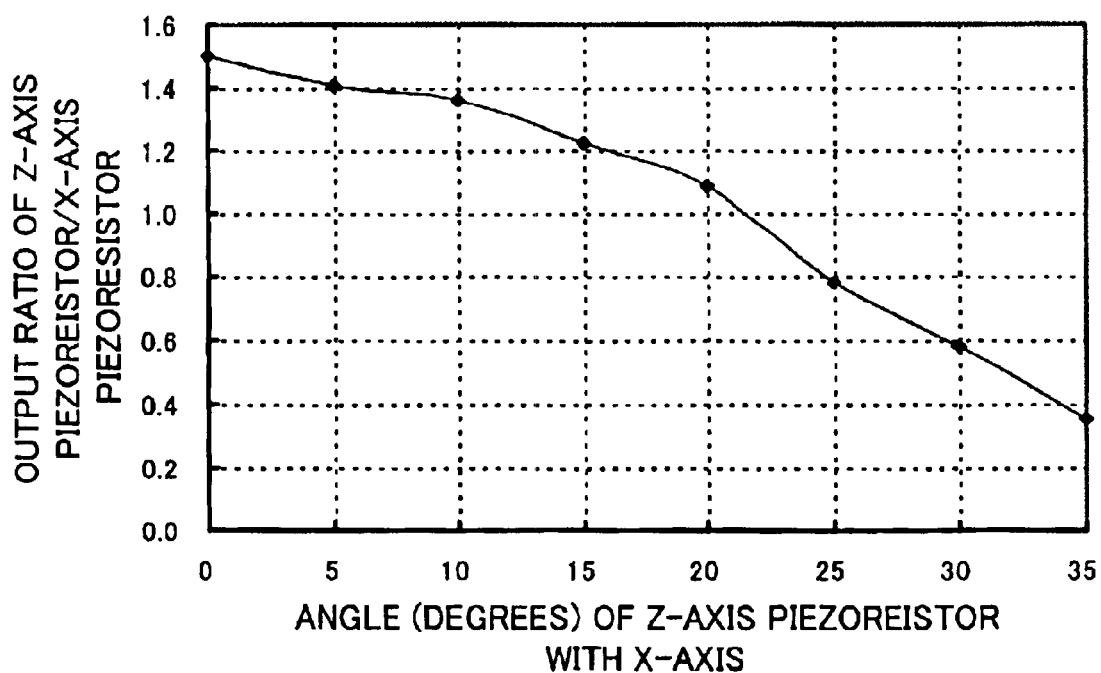
FIG. 10 is a graph showing ratio of Z-axis piezoresistor output to X-axis piezoresistor output vs. angle of Z-axis piezoresistor with X-axis in the acceleration sensor of EXAMPLE 3 of the present invention.
Figure 11:
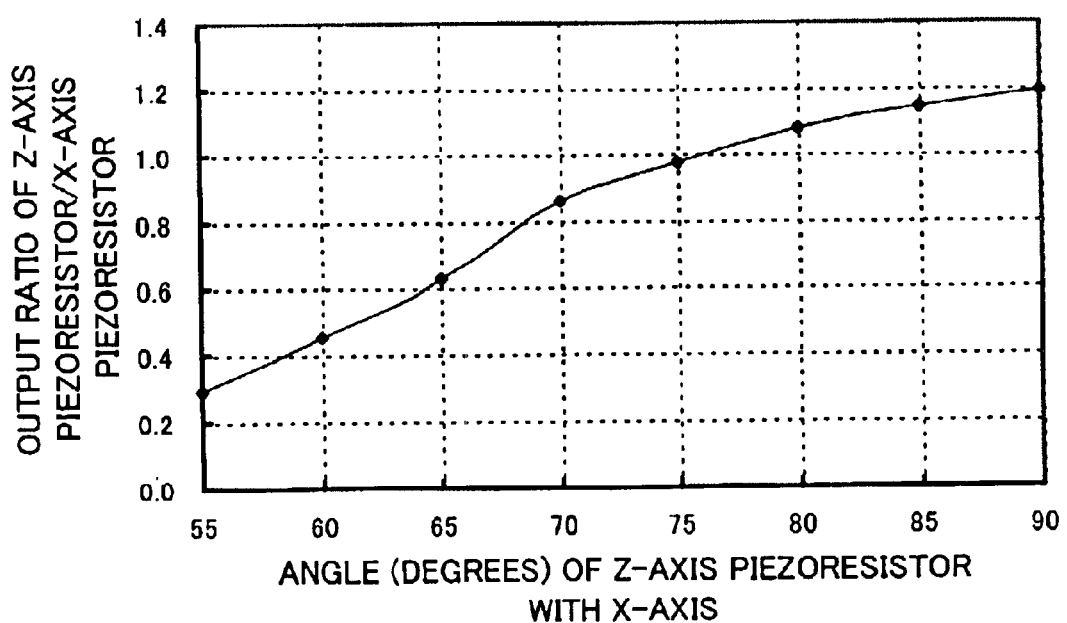
FIG. 11 is a graph showing ratio of Z-axis piezoresistor output to X-axis piezoresistor output vs. angle of Z-axis piezoresistor with X-axis in the acceleration sensor of EXAMPLE 3 of the present invention.

An acceleration sensor of an EXAMPLE 3 of the present invention will be explained with reference to FIGS. 8 through 11. FIG. 8 is a plan view of an acceleration sensor 300, FIG. 9 is an enlarged plan view showing one of elastic support arms in FIG. 8, and FIGS. 10 and 11 are graphs showing a ratio of a Z-axis piezoresistor output to an X-axis piezoresistor output in relation with an angle θ formed by the Z-axis piezoresistor with the X-axis in the acceleration sensor according to the EXAMPLE 3 of the present invention. The acceleration sensor 300 is substantially the same as the acceleration sensor 100 of the EXAMPLE 1, but piezoresistors 381 and 382 for detecting the acceleration in the Z-axis direction are provided on the elastic support arm 331, having an angle θ with the X-axis. Two piezoresistors 383 and 384 in the Z-axis direction, which are provided on the elastic support arm 333, have an angle θ with the X-axis.

The piezoresistor 381 is provided on the elastic support arm 331 so that one end thereof is located on a border between an inside edge of a top surface of a thick frame 310 and the elastic support arm 331, and the piezoresistor 382 is provided on the elastic support arm 331 so that one end thereof is located on a border between the elastic support arm 331 and a top surface edge of a mass portion 320. Similarly, the piezoresistor 383 is provided on the elastic support arm 333 so that one end thereof is located on a border between the top surface edge of the mass portion 320 and the elastic support arm 333, and the piezoresistor 384 is provided on the elastic support arm 333 so that one end thereof is located on a border between the elastic support arm 333 and an inside edge of the top surface of the thick frame 310. Piezoresistors 361 and 362, and 363 and 364 for detecting the acceleration in the X-axis direction and piezoresistors 371 and 372, and 373 and 374 for detecting the acceleration in the Y-axis direction are in the same relation with the elastic support arms 331 to 334 as in the EXAMPLES 1 and 2.

Distances between the Z-axis piezoresistors 381 and 382, and 383 and 384 are longer than distances between the X-axis piezoresistors 361 and 362, and 363 and 364 by 2L(1−cos θ) because the Z-axis piezoresistors have the angle θ with the X-axis, but when θ is small, the distances between the Z-axis piezoresistors are considered to be almost the same as the distances between the X-axis piezoresistors.

The angle θ of the Z-axis piezoresistors with the X-axis is 10 to 30 degrees or 65 to 90 degrees. More preferably, the angle is 15 to 25 degrees or 70 to 90 degrees. As the result of measuring a ratio of the Z-axis piezoresistor output to the X-axis piezoresistor output by changing the angle θ formed by the Z-axis piezoresistors with the X-axis from 0 to 90 degrees, the output ratios at the angle from 0 to 35 degrees are shown by the graph in FIG. 10, and the output ratios at the angle from 55 to 90 degrees are shown by the graph in FIG. 11. As is seen from these graphs, the ratio of the Z-axis piezoresistor output/the X-axis piezoresistor output becomes 1.0 when the angle is at about 20 degrees or at about 78 degrees. When the angle is at 10 to 30 degrees, the output ratio becomes 1.35 to 0.65. When the angle is 65 to 90 degrees, the output ratio becomes 0.65 to 1.25. From these graphs, it can be seen that in the acceleration sensor of the present invention, the Z-axis output and the X-axis (or Y-axis) output are at substantially the same level.

A production method of the acceleration sensor 100 of the invention will be explained below. FIGS. 12A through 12E show part (left half) of a section in the X-axis direction (II—II section) in FIG. 1 to explain a main process. As described above, an SOI wafer is a Si single crystal substrate constructed with a Si base substrate 60, an SOI layer 80 on the top surface, which is a Si active layer, and a $SiO_2$ layer 70, which is between the Si base substrate 60 and the SOI layer 80, and is used as an etching stopper, as denoted by reference numerals in FIG. 12A. As for the thickness thereof, the base substrate 60 has thickness of 625 μm, $SiO_2$ layer has thickness of 1 μm and the SOI layer has thickness of about 10 μm.

Figure 12A:
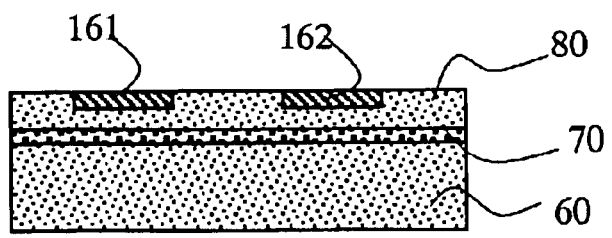
FIGS. 12A through 12E are explanatory views of a production process of the acceleration sensor of the present invention.

The first step of the production process is to make a pattern of a predetermined form with a photoresist or thermally oxidized $SiO_2$ film or the like on the surface of the SOI layer 80 and to make piezoresistors 161 and 162 with boron being diffused by an impurity diffusion process such as ion implantation (FIG. 12A). As surface impurity density, about $2 \times 10^{18}$ atoms/cm$^3$ is adopted, from the viewpoint of both the temperature characteristics and sensitivity.

Figure 12B:
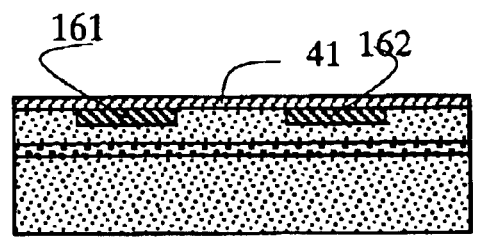

Next, to protect the piezoresistors 161 and 162, a protection film 41 is produced (FIG. 12B). As the protection film 41, a multilayer film of $SiO_2$ and PSG (Phosphorous silicated glass) that are generally used in a semiconductor technology are used to have a gettering effect of movable ion. Instead of the two-layer film of $SiO_2$ and PSG, a two-layer film of $SiO_2$ and SiN may be used. It is preferable that the thickness of the protection film 41 is made as thin as possible to decrease stress in terms of high sensitivity, and therefore it is made 0.3 μm to 0.5 μm.

Figure 12C:
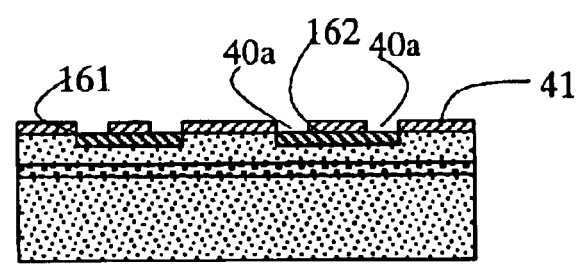

Next, through-holes 40a for connecting electrodes are formed in the protection film 41 on both ends of the piezoresistors 161 and 162 by a wet etching with hydrofluoric acid as a predominant ingredient (FIG. 12C).

Figure 12D:
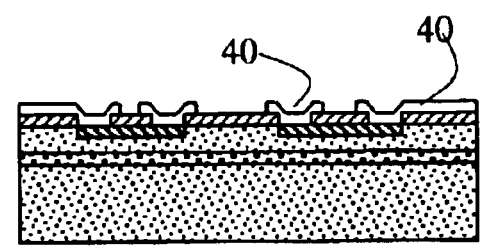

Next, to make electrode wiring, a film of aluminum alloy (aluminum, copper, silicon and the like are main ingredients) is formed by spattering. The thickness is 0.3 μm to 0.5 μm. Lead electrodes 40 are formed by photo etching (FIG. 12D).

Next, though not shown, the SOI layer 80 is etched by a dry etching method or the like to form a through-hole pattern 150 to the thin portion shown in FIG. 1.

Figure 12E:
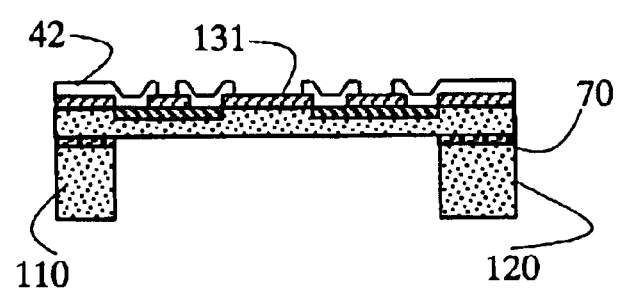
Figure 13:
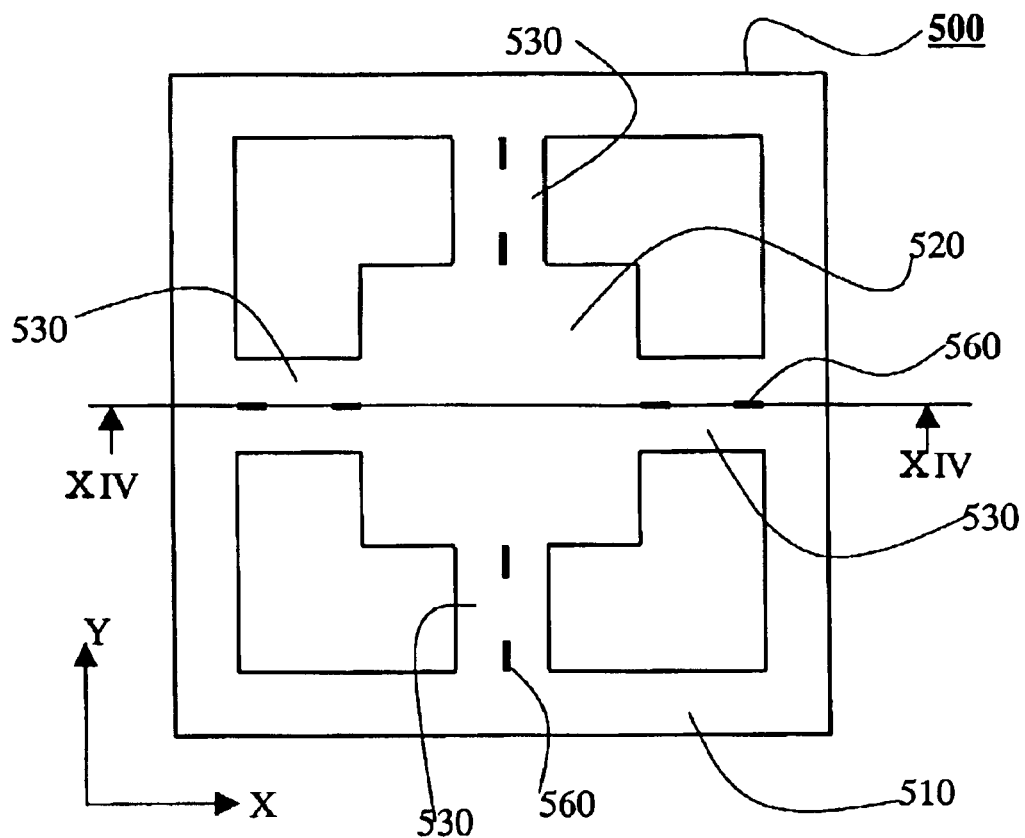
FIG. 13 is a plan view showing an acceleration sensor disclosed in a Japanese Laid-Open Patent.
Figure 14:
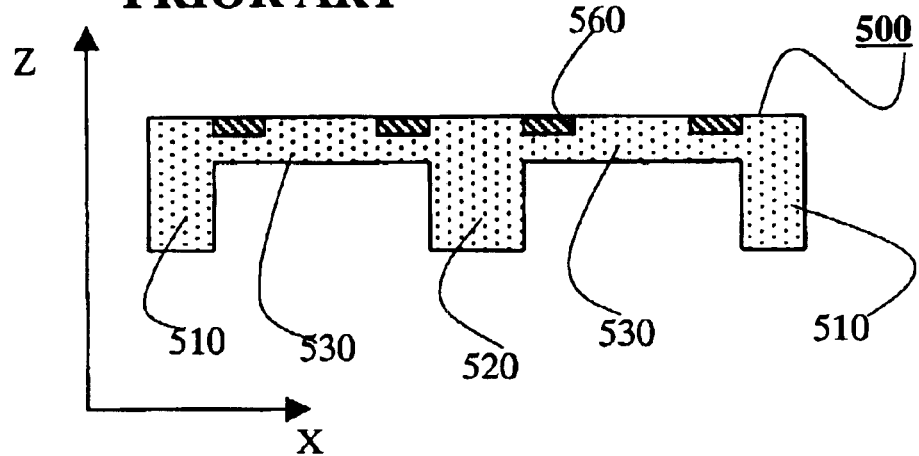
FIG. 14 is a sectional view of the acceleration sensor in FIG. 13 taken along the line XIV—XIV in FIG. 13.
Figure 15:
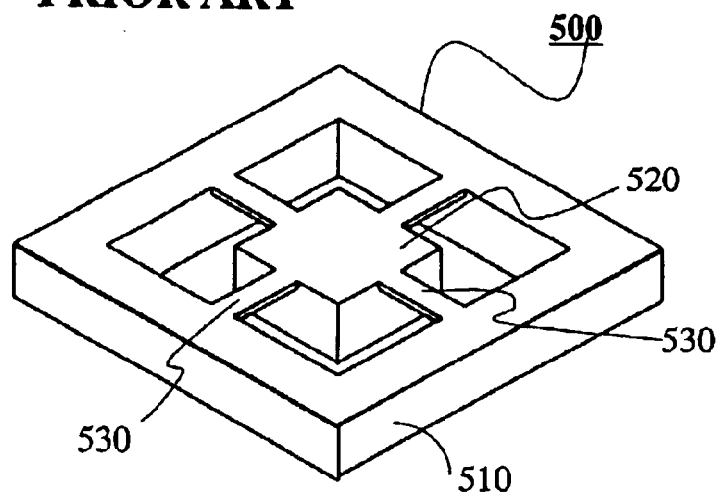
FIG. 15 is a perspective view of the acceleration sensor in FIG. 13.
Figure 16:
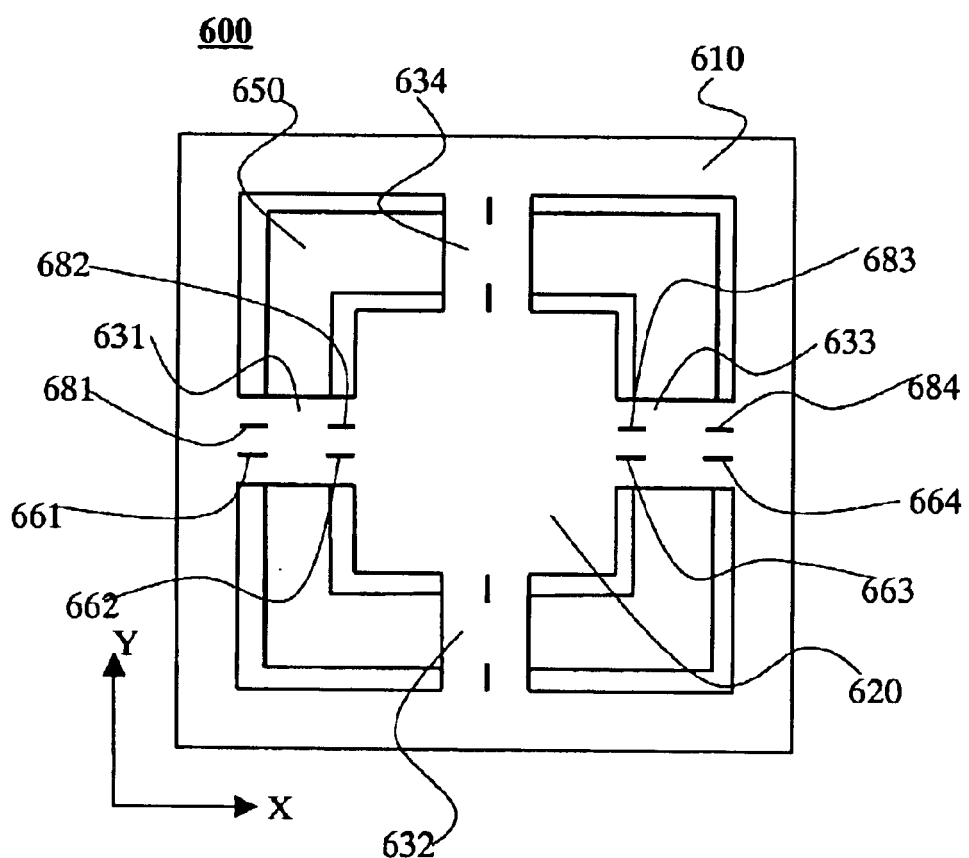
FIG. 16 is a plan view of an acceleration sensor proposed in a co-pending patent application by the applicant.
Figure 17:
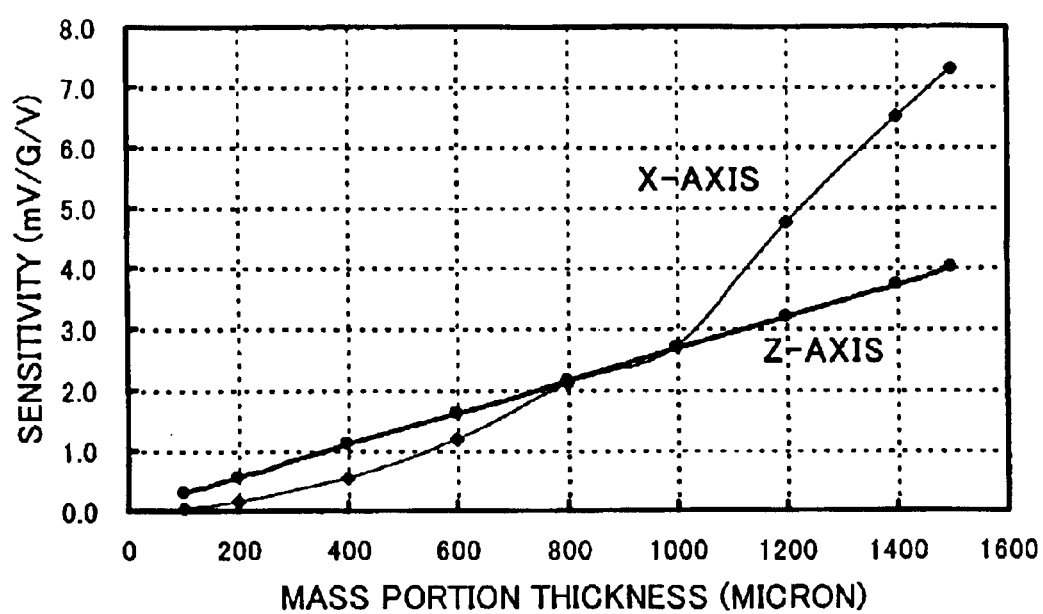
FIG. 17 is a graph showing X-axis strain gauge sensitivity vs. mass portion thickness and Y-axis strain gauge sensitivity vs. mass portion thickness in the acceleration sensor proposed in a co-pending patent application.

Next, on the base substrate 60 on the back surface a photoresist mask is formed in the shapes of the mass portion 120 and the frame 110 with the positions of the piezoresistors 161 and 162 on the surface, the through-hole pattern 150 to the SOI layer 80 and the like are aligned with use of a double-side aligner device, the base substrate 60 is etched by the dry etching method, and the $SiO_2$ layer 70 as the etching stopper is removed by wet etching (FIG. 12E). In the dry etching step, an etching process mainly using $SF_6$-gas and a process adhering polymer mainly containing $C_4F_8$-gas on the side walls and the inside walls are repeated alternately. As an etching solution to etch the $SiO_2$ layer, buffered hydrofluoric acid is used. Although the elastic support arms 131, 132, 133 and 134 are formed in the dry etching process, in some cases it is preferable to leave the $SiO_2$ layer 70 as the etching stopper without removing it in order to keep balance of the entire stress, forming a lamination of the $SiO_2$ layer and the silicon layer as the elastic support arms, and part of the $SiO_2$ layer 70 may be left as the etching stopper on the back side of the elastic support arms.

Thereafter, a number of acceleration sensor elements formed on the wafer are cut into sensor chips one by one with use of a dicer or the like, and via the assembly process such as packaging and the like, the semiconductor acceleration sensor 100 is completed.

As explained above, in the acceleration sensor of the present invention, the difference between the Z-axis output and the X-axis (or the Y-axis) output can be improved to be 35% or less, preferably, 20% or less. In addition, the resistance values and thermal properties of the strain gauges are the same, and therefore it is not necessary to prepare an amplifier for each axis, thus making it possible to provide a compact and less expensive semiconductor type triaxial acceleration sensor.

What is claimed is:

1. An acceleration sensor, comprising:
    a mass portion provided in a center of the acceleration sensor and having a top surface;
    a thick frame surrounding the mass portion with a predetermined distance from the mass portion and having a top surface;
    a plurality of elastic support arms each extending from an edge of the top surface of the mass portion, bridging the top surface edge of the mass portion and an inside edge of the top surface of the thick frame and hanging the mass portion inside of the thick frame;
    two first strain gauges disposed on a top surface of each of the elastic support arms with a distance from each other along an elastic support arm extending, and extending in the direction of the elastic support arm extending; and
    two second strain gauges disposed on the top surface of the elastic support arms having the two first strain gauges and with a distance different from the first strain gauge distance between the two second strain gauges along the elastic support arms, and extending in the direction of the elastic support arm extending,
    the two first strain gauges detecting an acceleration in the direction of the elastic support arm extending and the two second strain gauges detecting an acceleration in the direction perpendicular to the top surface of the mass portion.

2. An acceleration sensor as set forth in claim 1, wherein one of the two first strain gauges is disposed entirely on the top surface of the elastic support arms so that an end of the one of the first strain gauges is substantially located at the inside edge of the top surface of the thick frame, and the other of the two first strain gauges is disposed entirely on the top surface of the elastic support arms so that an end of the other of the first strain gauges is substantially located at the top surface edge of the mass portion.

3. An acceleration sensor as set forth in claim 2, wherein one of the two second strain gauges is disposed, bridging the top surface of the thick frame and the top surface of the elastic support arms so that one end of the one of the second strain gauges is located on the top surface of the elastic support arms and the other end of the one of the second strain gauges is located on the top surface of the thick frame.

4. An acceleration sensor as set forth in claim 3, wherein the other of the two second strain gauges is disposed, bridging the top surface of the mass portion and the top surface of the elastic support arms so that one end of the other of the second Strain gauges is located on the top surface of the mass portion and the other end of the other of the second strain gauges is located on the top surface of the elastic support arms.

5. An acceleration sensor as set forth in claim 2, wherein the distance between the two second strain gauges is longer by 0.4 to 1.2 times a length of the strain gauges than the distance between the two first strain gauges.

6. An acceleration sensor as set forth in claim 5, wherein the distance between the two second strain gauges is longer by 0.6 to 1.0 times a length of the strain gauges than the distance between the two first strain gauges.

7. An acceleration sensor as set forth in claim 2, wherein the two second strain gauges are disposed entirely on the top surface of the elastic support arms so that all ends of the two second strain gauges are apart from ends of the elastic support arms.

8. An acceleration sensor as set forth in claim 2, wherein the distance between the two second strain gauges is shorter by 1.0 to 1.8 times a length of the strain gauges than the distance between the two first strain gauges.

9. An acceleration sensor as set forth in claim 8, wherein the distance between the two second strain gauges is shorter by 1.2 to 1.6 times a length of the strain gauges than the distance between the two first strain gauges.

10. An acceleration sensor, comprising:
    a mass portion provided in a center of the acceleration sensor and having a top surface;
    a thick frame surrounding the mass portion with a predetermined distance from the mass portion and having a top surface;
    two first elastic support arms extending in parallel and in opposite directions to each other from opposite edges of the top surface of the mass portion, bridging the top surface edges of the mass portion and inside edges of the top surface of the thick frame and hanging the mass portion inside of the thick frame;
    two first strain gauges disposed on a top surface of each of the first elastic support arms with a distance from each other along the a first elastic support arm extending, and extending in the direction of the first elastic support arm extending, one of the two first strain gauges disposed entirely on the top surface of the first elastic support arms so that an end of the one of the two first strain gauges is located substantially at the inside edges of the top surface of the thick frame, and the other of the two first strain gauges disposed entirely on the top surface of the first elastic support arms so that an end of the other of the two first strain gauges is located substantially at the top surface edges of the mass portion;

two second strain gauges disposed on the top surface of each of the first elastic support arms with a distance longer by 0.4 to 1.2 times a length of the strain gauges than the distance between the two first strain gauges along the first elastic support arm extending, and extending in the direction of the first elastic support arms, one of the two second strain gauges disposed, bridging the top surface of the thick frame and the top surface of the first elastic support arms so that one end of the one of the two second strain gauges is located on the top surface of thick frame and the other end of the one of the two second strain gauges is located on the top surface of the first elastic support arms, and the other of the two second strain gauges disposed, bridging the top surface of the mass portion and the top surface of the first elastic support arms so that one end of the other of the two second strain gauges is located on the top surface of the mass portion and the other end of the other of the two second strain gauges is located on the top surface of the first elastic support arms;

two second elastic support arms extending in parallel and in opposite directions to each other from other opposite edges of the top surface of the mass portion, bridging the other top surface edges of the mass portion and other inside edges of the top surface of the thick frame and hanging the mass portion inside of the thick frame; and two third strain gauges disposed on a top surface of each of a second elastic support arms with a distance from each other along the second elastic support arm extending, and extending in the direction of the second elastic support arm extending, one of the two third strain gauges disposed entirely on the top surface of the second elastic support arms so that an end of the one of the two third strain gauges is located substantially at the other inside edge of the top surface of the thick frame, and the other of the two third strain gauges disposed entirely on the top surface of the second elastic support arms so that an end of the other of the two third strain gauges is located substantially at the top surface edges of the mass portion, the two first strain gauges detecting an acceleration in the direction of the first elastic support arm extending, the two second strain gauges detecting an acceleration in the direction perpendicular to the top surface of the mass portion and the two third strain gauges detecting an acceleration in the direction of the second elastic support arm extending.

11. An acceleration sensor, comprising:

a mass portion provided in a center of the acceleration sensor and having a top surface;

a thick frame surrounding the mass portion with a predetermined distance from the mass portion and having a top surface;

two first elastic support arms extending in parallel and in opposite directions to each other from opposite edges of the top surface of the mass portion, bridging the top surface edges of the mass portion and inside edges of the top surface of the thick frame and hanging the mass portion inside of the thick frame;

two first strain gauges disposed on a top surface of each of the first elastic support arms with a distance from each other along a first elastic support arm extending, and extending in the direction of the first elastic support arm extending, one of the two first strain gauges disposed entirely on the top surface of the first elastic support arms so that an end of the one of the two first strain gauges is located substantially at the inside edges of the top surface of the thick frame, and the other of the two first strain gauges disposed entirely on the top surface of the first elastic support arms so that an end of the other of the two first strain gauges is located substantially at the top surface edges of the mass portion;

two second strain gauges disposed on the top surface of each of the first elastic support arms with a distance shorter by 1.0 to 1.8 times a length of the strain gauges than the distance between the two first strain gauges along the first elastic support arm extending, and extending in the direction of the first elastic support arm, the two second strain gauges disposed entirely on the top surface of the first elastic support arms so that all ends of the two second strain gauges are apart from all ends of the top surface of the first elastic support arms;

two second elastic support arms extending in parallel and in opposite directions to each other from other opposite edges of the top surface of the mass portion, bridging the other top surface edges of the mass portion and other inside edges of the top surface of the thick frame and hanging the mass portion inside of the thick frame; and two third strain gauges disposed on a top surface of each of the second elastic support arms with a distance from each other along a second elastic support arm extending, and extending in the direction of the second elastic support arm extending, one of the two third strain gauges disposed entirely on the top surface of the second elastic support arms so that an end of the one of the two third strain gauges is located substantially at the other inside edges of the top surface of the thick frame, and the other of the two third strain gauges disposed entirely on the top surface of the second elastic support arms so that an end of the other of the two third strain gauges is located substantially at the top surface edges of the mass portion, the two first strain gauges detecting an acceleration in the direction of the first elastic support arm extending, the two second strain gauges detecting an acceleration in the direction perpendicular to the top surface of the mass portion and the two third strain gauges detecting an acceleration in the direction of the second elastic support arm extending.

12. An acceleration sensor, comprising;

a mass portion provided in a center of the acceleration sensor and having a top surface;

a thick frame surrounding the mass portion with a predetermined distance from the mass portion and having a top surface;

a plurality of elastic support arms each extending from an edge of the top surface of the mass portion, bridging the top surface edge of the mass portion and an inside edge of the top surface of the thick frame and hanging the mass portion inside of the thick frame; two first strain gauges disposed on a top surface of each of the elastic support arms with a distance from each other along an elastic support arm extending, and extending in the direction of the elastic support arm extending; and two second strain gauges disposed on the top surface of the elastic support arms having the two first strain gauges and at an angle with the direction of the elastic support arm extending, the two first strain gauges detecting an acceleration in the direction of the elastic support arm extending and the two second strain gauges detecting an acceleration in the direction perpendicular to the top surface of the mass portion.

13. An acceleration sensor as set forth in claim 12, wherein one of the two first strain gauges and one of the two second strain gauges are disposed entirely on the top surface of the elastic support arms so that an end of each of the one of the two first strain gauges and the one of the two second strain gauges is substantially located at the inside edge of the top surface of the thick frame, and the other of the two first strain gauges and the other of the two second strain gauges are disposed entirely on the top surface of the elastic support arms so that an end of each of the other of the two first strain gauges and the other of the two second strain gauges is substantially located at the top surface edge of the mass portion.

14. An acceleration sensor as set forth in claim 13, wherein each of the two second strain gauges is disposed at an angle of 10 to 30 degrees or 65 to 90 degrees with the direction of the elastic support arm extending.

15. An acceleration sensor, comprising:

a mass portion provided in a center of the acceleration sensor and having a top surface;

a thick frame surrounding the mass portion with a predetermined distance from the mass portion and having a top surface;

two first elastic support arms extending in parallel and in opposite directions to each other from opposite edges of the top surface of the mass portion, bridging the top surface edges of the mass portion and inside edges of the top surface of the thick frame and hanging the mass portion inside of the thick frame;

two first strain gauges disposed on a top surface of each of the first elastic support arms with a distance from each other along a first elastic support arm extending, and extending in the direction of the first elastic support arm extending, two second strain gauges disposed on the top surface of each of the first elastic support arms at an angle of 10 to 30 degrees or 65 to 90 degrees with the direction of the first elastic support arm extending, one of the two first strain gauges and one of the two second strain gauges disposed entirely on the top surface of the first elastic support arms so that an end of each of the one of the two first strain gauges and the one of the two second strain gauges is located substantially at the inside edges of the top surface of the thick frame, and the other of the two first strain gauges and the other of the two second strain gauges disposed entirely on the top surface of the first elastic support arms so that an end of each of the other of the two first strain gauges and the other of the two second strain gauges is located substantially at the top surface edges of the mass portion;

two second elastic support arms extending in parallel and in opposite directions to each other from other opposite edges of the top surface of the mass portion, bridging the other top surface edges of the mass portion and other inside edges of the top surface of the thick frame and hanging the mass portion inside of the thick frame; and two third strain gauges disposed on a top surface of each of the second elastic support arms with a distance from each other along a second elastic support arm extending, and extending in the direction of the second elastic support arm extending, one of the two third strain gauges disposed entirely on the top surface of the second elastic support arms so that an end of the one of the two third strain gauges is located substantially at the other inside edges of the top surface of the thick frame, and the other of the two third strain gauges disposed entirely on the top surface of the second elastic support arms so that an end of the other of the two third strain gauges is located substantially at the top surface edges of the mass portion, the two first strain gauges detecting an acceleration in the direction of the first elastic support arm extending, the two second strain gauges detecting an acceleration in the direction perpendicular to the top surface of the mass portion and the two third strain gauges detecting an acceleration in the direction of the second elastic support arm extending.

16. An acceleration sensor, comprising:

a mass portion provided in a center of the acceleration sensor and having a top surface;

a thick frame surrounding the mass portion with a predetermined distance from the mass portion and having a top surface;

a plurality of elastic support arms each extending from an edge of the top surface of the mass portion, bridging the top surface edge of the mass portion and an inside edge of the top surface of the thick frame and hanging the mass portion inside of the thick frame;

two first strain gauges disposed on a top surface of each of the elastic support arms with a distance from each other along an elastic support arm extending, and extending in the direction of the elastic support arm extending; and two second strain gauges disposed on the top surface of the elastic support arms having the two first strain gauges and with a distance different from the first strain gauge distance between the two second strain gauges along the elastic support arms, and extending at an angle with the direction of the elastic support arm extending, the two first strain gauges detecting an acceleration in the direction of the elastic support arm extending and the two second strain gauges detecting an acceleration in the direction perpendicular to the top surface of the mass portion.

17. An acceleration sensor as set forth in claim 16, wherein one of the two first strain gauges and one of the two second strain gauges are disposed entirely on the top surface of the elastic support arms so that an end of each of the one of the two first strain gauges and the one of the two second strain gauges is substantially located at the inside edge of the top surface of the thick frame, and the other of the two first strain gauges and the other of the two second strain gauges are disposed entirely on the top surface of the elastic support arms so that an end of each of the other of the two first strain gauges and the other of the two second strain gauges is substantially located at the top surface edge of the mass portion.

18. An acceleration sensor as set forth in claim 17, wherein each of the two second strain gauges is disposed at an angle of 10 to 30 degrees or 65 to 90 degrees with the direction of the elastic support arm extending.

19. An acceleration sensor as set forth in claim 18, wherein the distance between the two second strain gauges is longer by 0.4 to 1.2 times a length of the strain gauges than the distance between the two first strain gauges.

20. An acceleration sensor as set forth in claim 19, wherein the distance between the two second strain gauges is longer by 0.6 to 1.0 times a length of the strain gauges than the distance between the two first strain gauges.

21. An acceleration sensor as set forth in claim 18, wherein the two second strain gauges are disposed entirely on the top surface of the elastic support arms so that all ends of the two second strain gauges are apart from ends of the elastic support arms.

22. An acceleration sensor as set forth in claim 21, wherein the distance between the two second strain gauges is shorter by 1.0 to 1.8 times a length of the strain gauges than the distance between the two first strain gauges.

* * * * *